United States Patent [19]
Weil et al.

[11] 3,843,706
[45] Oct. 22, 1974

[54] LONG CHAIN ETHER ALCOHOL SULFATES FROM PROPYLENE OXIDE AND 1,2-BUTYLENE OXIDE

[75] Inventors: James K. Weil, North Wales; Alexander J. Stirton, Philadelphia, both of Pa.

[73] Assignee: The United States of America as represented by the Secretary of Agriculture, Washington, D.C.

[22] Filed: Dec. 1, 1971

[21] Appl. No.: 203,867

Related U.S. Application Data

[62] Division of Ser. No. 844,699, May 23, 1969, abandoned, which is a division of Ser. No. 557,375, June 14, 1966, abandoned.

[52] U.S. Cl. ............ 260/458, 252/551, 260/615 B
[51] Int. Cl. .......................................... C07c 141/00
[58] Field of Search ..................................... 260/458

[56] References Cited
FOREIGN PATENTS OR APPLICATIONS
797,119   6/1958   Great Britain ..................... 260/458
443,559   2/1936   Great Britain ..................... 260/458

OTHER PUBLICATIONS
J. Weil et al., J.A.O.C.S., 43 (3), pp. 157–160, (March 1966).
Bistline et al., J.A.O.C.S., 34 (10), pp. 516–518, (1957).

*Primary Examiner*—Leon Zitver
*Assistant Examiner*—Norman Morgenstern
*Attorney, Agent, or Firm*—M. Howard Silverstein; Max D. Hensley

[57] ABSTRACT

The present invention is directed to long chain ether alcohols and alcohol sulfates from propylene oxide and 1,2-butylene oxide having the formula $R[OCH_2CH(R')]_nOY$, wherein R is an n-alkyl radical containing 12 to 18 carbon atoms; R' is selected from methyl and ethyl; n is an integer from 1 to 4; and Y is selected from H and $SO_3M$, wherein M is selected from Na, K, Li, $NH_4$ and $NH(C_2H_4OH)_3$, useful as biodegradable detergents.

1 Claim, No Drawings

LONG CHAIN ETHER ALCOHOL SULFATES FROM PROPYLENE OXIDE AND 1,2-BUTYLENE OXIDE

This is a division of application Ser. No. 844,699 filed May 23, 1969 which is a division of application Ser. No. 557,375, filed June 14, 1966 both now abandoned.

A non-exclusive, irrevocable, royalty-free license in the invention herein described, throughout the world for all purposes of the U.S. Government, with the power to grant sublicenses for such purposes, is hereby granted to the Government of the United States of America.

This invention relates to biodegradable detergents. More particularly this invention relates to novel long carbon chain ether alcohol sulfates.

An object of the present invention is to provide readily soluble, easily biodegradable detergents from long chain primary alcohols, particularly those derivable from animal fats. Long chain sodium alkyl sulfates derivable from saturated tallow alcohols, mainly sodium hexadecyl sulfate and sodium octadecyl sulfate, are good detergents at higher washing temperatures. However, because of limited solubility at room temperature or slightly above room temperature they cannot function as the sole active ingredient in household detergent compositions, but they require the presence of a more soluble type of detergent also. The usefulness of the tallow alcohol sulfates is restricted because of limited solubility and they cannot enter into the formulation of a variety of types of detergents, such as liquid detergents or cold water detergents.

Only ether alcohol sulfates based on long carbon chain alcohols and ethylene oxide have been previously prepared. Since propylene oxide and butylene oxide contain more hydrophobic methyl and methylene groups than ethylene oxide, it has been assumed that surface active products derived from them would be less soluble in water and have little use. Quite unexpectedly and contrary to predictions, however, we have discovered that ether alcohol sulfates based on propylene oxide or 1,2-butylene oxide are actually more soluble than corresponding products based on ethylene oxide.

Another object of the present invention is to prepare biodegradable, water soluble anionic detergents that are good lime soap dispersing agents. A further object is to provide chemical intermediates from which to prepare the anionic detergents. Still another object is to prepare anionic detergents which are useful in the form of built compositions.

Other objects and a fuller understanding of the invention will become apparent upon referring to the following description and claims.

The compounds of the present invention can be represented by the formula:

$$R[OCH_2CH(R')]_nOY$$

wherein R is an n-alkyl radical containing from 12 to 18 carbon atoms; R' is selected from methyl and ethyl; n is an integer from 1 to 4; and Y is selected from H and $SO_3M$, wherein M is selected from Na, K, Li, $NH_4$, and $NH(C_2H_4OH)_3$.

The ether alcohols of our invention have been found to have an important advantage as anionic detergent intermediates compared to ether alcohols from ethylene oxide. The alkali-catalyzed reaction of a long chain primary alcohol with ethylene oxide produces a first derivative $ROCH_2CH_2OH$ which is more reactive than the parent alcohol and reacts further with ethylene oxide in preference to reaction of the parent alcohol with ethylene oxide. This behavior is represented as follows:

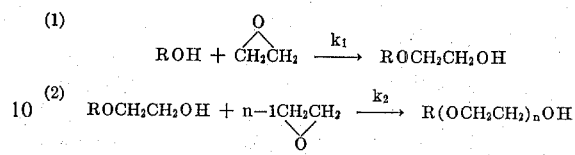

At any given time, for relatively small values of $n$, the reaction mixture will consist of unchanged parent alcohol, the first derivative, and the second and succeeding derivatives in relative amounts which can be predicted from a mathematical expression known as the Weibull-Nycander equation. The distribution constant O, or ratio of the velocity of reaction (2) to reaction (1) is given as follows:

$O = k_2/k_1 = 3.0$. In the synthesis of ether alcohol sulfates it is desirable that the value of n be small, suitably in the range $n = 1-3$, or else the product has more nonionic than anionic character and is less suitable as a heavy duty detergent. The high value of the distribution constant means that the reaction cannot be directed to relatively high yields of the first derivative. Thus a further object of our invention is to obtain relatively high yields of the ether alcohol first derivative.

We have discovered that, in contrast to the use of ethylene oxide, high yields of the desired ether alcohol first derivative $ROCH_2CHOHCH_3$ or $ROCH_2CHOHCH_2CH_3$ are possible with the use of propylene oxide or 1,2-butylene oxide in place of ethylene oxide. The reaction may be represented as follows:

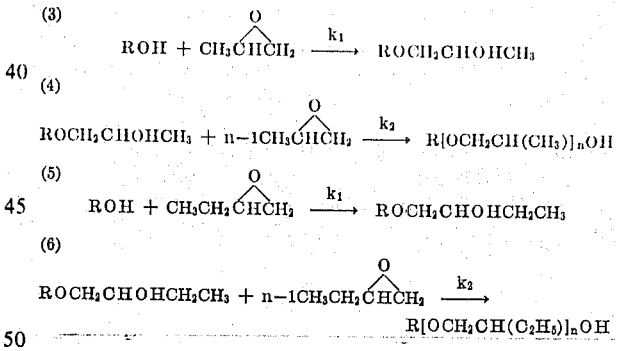

The distribution constants $C = k_2/k_1$ are found to be 0.5 and 0.3 for oxypropylation and oxybutylation respectively. This means that at relatively low values of n the first derivative is the major component in the reaction mixture, in contrast to what is true for oxyethylation.

Product distribution in oxypropylation was obtained by gasliquid chromatography of the acetates $R[OCH_2CH(CH_3)]_nO_2CCH_3$ and fractional distillation of the acetates. These two methods were found to agree very well and to coincide closely with the values predicted from the Weibull-Nycander equation. Results obtained in the reaction of propylene oxide with hexadecanol at 160°–175°C in the presence of 0.5 percent potassium hydroxide catalyst, to give a product with an average of 1.20 oxypropyl groups per mole of hexadecanol are shown in Table I. The data of Table I indicate almost a 90 percent yield of derivatives, of which half are the first derivative ($n=1$). Substantially all of the oxypropylated product falls in the range of $n=1$ to 4, with most of the product having the preferred structure of $n=1$ to 3.

TABLE I

DISTRIBUTION OF PRODUCTS, $C_{16}H_{33}[OCH_2CH(CH_3)]_nOH$, IN THE REACTION OF PROPYLENE OXIDE WITH HEXADECANOL

| | Calculated by the Weibull-Nycander equation. | FOUND, mole fractions | |
|---|---|---|---|
| | | By CLC of the acetates | By fractional distillation of the acetates |
| Parent alcohol, n = 0 | — | 0.130 | 0.121 |
| 1st derivative, n = 1 | 0.461 | 0.459 | 0.444 |
| 2nd derivative, n = 2 | 0.274 | 0.272 | 0.263 |
| 3rd derivative, n = 3 | 0.102 | 0.103 | 0.121 |
| 4th derivative, n = 4 | 0.027 | 0.029 | 0.040 |
| 5th derivative, n = 5 | 0.006 | 0.007 | 0.010 |

The analytical values and physical constants for the pure ether alcohols of our invention are shown in Table II. These are new compounds which have not previously been reported in a pure state.

Comparative freezing points of ether alcohols are an indication of the degree of usefulness of the ether alcohol as an intermediate for the production of more soluble ether alcohol sulfates. It can be expected that ether alcohols of lower freezing point will form more soluble ether alcohol sulfates. The ether alcohols from propylene oxide and 1,2-butylene oxide from this consideration thus have an advantage over ether alcohols from ethylene oxide, particularly evident in the case of derivatives of the tallow alcohols, hexadecanol and octadecanol. Comparison of freezing points, listed in Table III, shows that the freezing point is lower for oxypropyl and oxybutyl derivatives.

The ether alcohols of the present invention can be converted to water soluble nonionic detergents by further reaction with ethylene oxide, propylene oxide, or butylene oxide.

The ether alcohols are converted to the improved biodegradable water soluble anionic detergents of the present invention by sulfation with sulfuric acid, chlorosulfonic acid, sulfur trioxide, dioxanesulfur trioxide or other adducts of sulfur trioxide. The reaction mixture comprising the first derivative as the main component can be used for sulfation to produce an improved detergent, or the pure first derivative may be separated by distillation and then sulfated.

TABLE II

LONG CHAIN ETHER ALCOHOLS FROM PROPYLENE OXIDE AND 1,2-BUTYLENE OXIDE

| | ANALYSIS | | | | Freezing Point °C | $n_D$ |
|---|---|---|---|---|---|---|
| | Found | | Theory | | | |
| | %C | % H | % C | % E | | |
| $C_{12}H_{25}OCH_2CHOHCH_3$ | 73.59 | 13.13 | 73.71 | 13.20 | 25 | 1.4269 |
| $C_{12}H_{25}[OCH_2CH(CH_3)]_2OH$ | 71.56 | 12.57 | 71.47 | 12.66 | −15 | 1.4278 |
| $C_{14}H_{29}OCH_2CHOHCH_3$ | 74.88 | 13.15 | 74.94 | 13.32 | 33 | 1.4387 |
| $C_{14}H_{29}[OCH_2CH(CH_3)]_2OH$ | 72.44 | 12.66 | 72.67 | 12.81 | 3 | 1.4307 |
| $C_{16}H_{33}OCH_2CHOHCH_3$ | 76.25 | 13.56 | 75.93 | 13.42 | 39 | 1.4330 |
| $C_{16}H_{33}[OCH_2CH(CH_3)]_2OH$ | 73.68 | 12.72 | 73.68 | 12.93 | 19 | 1.4330 |
| $C_{18}H_{37}OCH_2CHOHCH_3$ | 76.86 | 13.42 | 76.76 | 13.50 | 41 | 1.4352 |
| $C_{18}H_{37}[OCH_2CH(CH_3)]_2OH$ | 74.74 | 12.92 | 74.55 | 13.04 | 30 | 1.4348 |
| $C_{12}H_{25}OCH_2CHOHC_2H_5$ | 74.15 | 13.11 | 74.36 | 13.26 | 1 | 1.4270 |
| $C_{12}H_{25}[OCH_2CH(C_2H_5)]_2OH$ | 72.76 | 12.81 | 72.67 | 12.81 | −28 | 1.4301 |
| $C_{14}H_{29}OCH_2CHOHC_2H_5$ | 75.47 | 13.32 | 75.46 | 13.37 | 14 | 1.4311 |
| $C_{14}H_{29}[OCH_2CH(C_2H_5)]_2OH$ | 73.80 | 12.72 | 73.68 | 12.93 | −8 | 1.4325 |
| $C_{16}H_{33}OCH_2CHOHC_2H_5$ | 76.08 | 13.23 | 76.37 | 13.46 | 26 | 1.4337 |
| $C_{16}H_{33}[OCH_2CH(C_2H_5)]_2OH$ | 74.37 | 12.91 | 74.55 | 13.04 | 10 | 1.4344 |
| $C_{18}H_{37}OCH_2CHOHC_2H_5$ | 77.12 | 13.49 | 77.12 | 13.53 | 36 | 1.4357 |
| $C_{18}H_{37}[OCH_2CH(C_2H_5)]_2OH$ | 75.39 | 13.19 | 75.30 | 13.13 | 19 | 1.4363 |

TABLE III.—FREEZING POINTS OF ETHER ALCOHOLS (° C.)

| | Hexadecanol | | Octadecanol | |
|---|---|---|---|---|
| Alkylene oxide | First derivative | Second derivative | First derivative | Second derivative |
| $\overset{O}{\underset{CH_2CH_2}{\triangle}}$ | 43 | 37 | 52 | 45 |
| $\overset{O}{\underset{CH_3CH-CH_2}{\triangle}}$ | 39 | 19 | 41 | 30 |
| $\overset{O}{\underset{C_2H_5CH-CH_2}{\triangle}}$ | 26 | 10 | 36 | 19 |

Alternatively the reaction mixture can be distilled to remove only the unreacted parent alcohol, prior to sulfation of the remaining reaction mixture. Analyses for sodium and sulfur on the pure ether alcohol sulfates of our invention are shown in Table IV. The ether alcohol sulfates have melting points or melting point ranges which may be observed under a hot stage microscope and these are also shown in Table IV.

Ether alcohol sulfates containing one oxyethyl group [-$OCH_2CH_2$-] melt higher than corresponding ether alcohol sulfates having an oxypropyl group [-$OCH_2CH(CH_3)$-] which in turn melt higher than those with one oxybutyl group, [-$OCH_2CH(C_2H_5)$-]. Ether alcohol sulfates having two oxypropyl or oxybutyl groups have still lower melting points as is evident in Table IV. In general ether alcohol sulfates of lower melting point are more soluble.

The ether alcohol sulfates of our invention are very soluble in water, particularly those derived from dodecanol and tetradecanol. For example the sulfated monoxypropylated derivative from tetradecanol is soluble up to a concentration of 40 percent at which concentration it forms a clear gel at room temperature.

The surface active properties of the pure ether alcohol sulfates of our invention are shown in Table V. The increased solubility of the ether alcohol sulfates is evident in the lower Krafft point of the oxypropyl and oxbutyl derivatives. The values for lime soap dispersing power are about 10 percent. This is highly desirable and means that only about 10 grams or less of the ether alcohol sulfate are required to disperse the calcium soap formed from 100 grams of sodium oleate. Thus the compounds of our invention are useful with soap in hard water.

The ether alcohol sulfates also show good detergency when used in the form of built solutions in hard water (Table V, fourth column). The particular composition of the builder, described in a footnote to Table V, is not intended to be a limiting factor. Other combinations and ratios of the inorganic salts are used in conventional builders, often without the carboxymethylcellulose. Foam height is lowered by oxyalkylation, particularly for tallow alcohol derivatives, and this may be a desirable feature to avoid excessive foaming during washing operations. The process to provide the products of the present invention, oxyalkylation with propylene oxide or butylene oxide, followed by sulfation, therefore results in improvements over the parent alcohol sulfate with increased general usefulness as a result of greater solubility and the ability to disperse soap in hard water.

The critical micelle concentration (cmc), the concentration at which micelles begin to form from simple ions and molecules, is a fundamental characteristic of surface active agents, dependent upon molecular structure. In Table V the cmc decreases with increasing size of the oxyalkyl group and the degree of oxyalkylation.

It is not necessary to separate the individual ether alcohol by fractional distillation or other devices in order to accomplish the objects of our invention. The entire reaction mixture, which will contain unreacted parent alcohol, a major portion of the first derivative and smaller amounts of secondary and further derivatives, may be sulfated to give a detergent product with improved solubility and general usefulness. It is also possible to separate the parent

TABLE IV

ANALYSIS AND MELTING POINT OF ETHER ALCOHOL SULFATES

| | % Na found | % Na theory | % S found | % S theory | Melting[a] point °C. |
|---|---|---|---|---|---|
| $C_{12}H_{25}OCH_2CH(CH_3)OSO_3Na$ | 6.68 | 6.64 | 9.29 | 9.26 | 137–142° |
| $C_{12}H_{25}[OCH_2CH(CH_3)]_2SO_3Na$ | 5.90 | 5.68 | 7.96 | 7.93 | 87–93° |
| $C_{14}H_{29}OCH_2CH(CH_3)OSO_3Na$ | 6.05 | 6.14 | 8.28 | 8.56 | 139–140° |
| $C_{14}H_{29}[OCH_2CH(CH_3)]_2OSO_3Na$ | 5.47 | 5.32 | 7.75 | 7.41 | 82–87° |
| $C_{16}H_{33}OCH_2CH(CH_3)OSO_3Na$ | 5.63 | 5.71 | 7.72 | 7.97 | 131–133° |
| $C_{16}H_{33}[OCH_2CH(CH_3)]_2OSO_3Na$ | 4.90 | 4.99 | 7.11 | 6.96 | 81–84° |
| $C_{18}H_{37}OCH_2CH(CH_3)OSO_3Na$ | 5.34 | 5.34 | 7.37 | 7.45 | 134–137° |
| $C_{18}H_{37}[OCH_2CH(CH_3)]_2OSO_3Na$ | 4.71 | 4.71 | 6.44 | 6.56 | 80–82° |
| $C_{12}H_{25}OCH_2CH(C_2H_5)OSO_3Na$ | 6.34 | 6.38 | 9.04 | 8.90 | 77–82° |
| $C_{14}H_{29}OCH_2CH(C_2H_5)OSO_3Na$ | 5.86 | 5.92 | 8.19 | 8.25 | 74–76° |
| $C_{14}H_{29}[OCH_2CH(C_2H_5)]_2OSO_3Na$ | 4.82 | 4.99 | 6.80 | 6.96 | Liquid at room temperature |
| $C_{16}H_{33}OCH_2CH(C_2H_5)OSO_3Na$ | 5.60 | 5.52 | 7.89 | 7.70 | 84–85° |
| $C_{16}H_{33}[OCH_2CH(C_2H_5)]_2OSO_3Na$ | 4.69 | 4.71 | 6.78 | 6.56 | Liquid at room temperature |
| $C_{18}H_{37}OCH_2CH(C_2H_5)OSO_3Na$ | 5.09 | 5.17 | 6.99 | 7.21 | 69–73° |
| $C_{18}H_{37}[OCH_2CH(C_2H_5)]_2OSO_3Na$ | 4.39 | 4.45 | 6.07 | 6.21 | 35° |

[a] Hot stage microscope. For comparison the melting point of $C_{18}H_{37}OC_2H_4OSO_3Na$ is 184–187°.

TABLE V

SURFACE ACTIVE PROPERTIES OF PURE ETHER ALCOHOL SULFATES

| | cmc,[a] millimoles per liter | Krafft point 1% sol. °C. | Lime soap disp. power % | Detergency ΔIb, .05% +.2% builder 60° C., 300 p.p.m. | Foam height, .05% +.2% builder 60° C., 300 p.p.m., mm. |
|---|---|---|---|---|---|
| $C_{12}H_{25}OCH_2CH(CH_3)OSO_3Na$ | 2.69 | clear at zero | 14 | 22 | 210 |

TABLE V—Continued

SURFACE ACTIVE PROPERTIES OF PURE ETHER ALCOHOL SULFATES

| | cmc,[a] millimoles per liter | Krafft point 1% sol. °C. | Lime soap disp. power % | Detergency $\Delta$Ib, .05% +.2% builder 60° C., 300 p.p.m. | Foam height, .05% +.2% builder 60° C., 300 p.p.m., mm. |
|---|---|---|---|---|---|
| $C_{12}H_{25}[OCH_2CH(CH_3)]OSO_3Na$ | 1.54 | clear at zero | 6 | 21 | 205 |
| $C_{14}H_{29}OCH_2CH(CH_3)OSO_3Na$ | 0.58 | 14° | 8 | 26 | 220 |
| $C_{14}H_{29}[OCH_2CH(CH_3)]_2OSO_3Na$ | 0.36 | clear at zero | 9 | 23 | 200 |
| $C_{16}H_{33}OCH_2CH(CH_3)(OSO_3Na$ | 0.16 | 27° | 8 | 27 | 185 |
| $C_{16}H_{33}[OCH_2CH(CH_3)]_2OSO_3Na$ | 0.076 | 19° | 7 | 26 | 175 |
| $C_{18}H_{37}OCH_2CH(CH_3(OSO_3Na$ | c | 43° | 8 | 28 | 100 |
| $C_{18}H_{37}[OCH_2CH(CH_3)]_2OSO_3Na$ | 0.041 | 31° | 7 | 25 | 90 |
| $C_{12}H_{25}OCH_2CH(C_2H_5)OSO_3Na$ | 1.8 | clear at zero | 10 | 22 | 225 |
| $C_{12}H_{25}[OCH_2CH(C_2H_5)]_2OSO_3Na$ | 0.8 | clear at zero | 10 | 21 | 210 |
| $C_{14}H_{29}OCH_2CH(C_2H_5)OSO_3Na$ | 0.43 | 13° | 9 | 25 | 200 |
| $C_{14}H_{29}[OCH_2CH(C_2H_5)]_2OSO_3Na$ | 0.20 | clear at zero | 19 | 22 | 175 |
| $C_{16}H_{33}OCH_2CH(C_2H_5)OSO_3Na$ | 0.12 | 23° | 9 | 26 | 155 |
| $C_{16}H_{33}[OCH_2CH(C_2H_5)]_2OSO_3Na$ | 0.061 | 21° | 8 | 24 | 50 |
| $C_{18}H_{37}OCH_2CH(C_2H_5)OSO_3Na$ | c | 38° | 10 | 26 | 75 |
| $C_{18}H_{37}[OCH_2CH(C_2H_5)]_2OSO_3Na$ | 0.051 | 24° | 11 | 26 | 35 |
| $C_{12}H_{25}OSO_3Na$ | 6.8 | 16° | 30 | 18 | 185 |
| $C_{18}H_{37}OSO_3Na$ | c | 56° | c | 28 | 190 |
| $C_{18}H_{37}OCH_2CH_2OSO_3Na$ | 0.11 | 46° | 9 | 29 | 100 |

[a] Critical Micella Concentration
[b] $\Delta$r=increase in reflectance after washing standard soiled cotton in the Targo-O-Tereter. Builder=55% $Na_5P_3O_{10}$, 24.4 $Na_2SO_4$, 10% $Na_4P_2O_7$, 10% Na metasilicate, 1% carboxymethylcellulose.
[c] Not soluble enough for the test conditions unreacted alcohol and return it to the oxyalkylation step, and to sulfate the remaining oxyalkylated reaction product containing the first derivative as the major component. The surface active properties of the unseparated ether alcohol sulfates of our invention are shown in Table VI. The mixtures shown are direct sulfation products from the oxyalkylation reaction mixture, except for 4, which is the sulfation product after parent alcohol and the first derivative have been removed by distillation. As a result of the loss of the first derivative, detergency and foam height is decreased but the product has excellent lime soap dispersing properties. The properties of the direct sulfation mixtures compare well with those of the individual ether alcohol sulfates of Table V.

As shown in Table VI, 1 and 7, mixtures containing mono-oxyalkylated parent alcohol can have an average value of n which is less than 1. While the means of producing mixtures of ether alcohol sulfates with considerably higher or lower average values of n than those of Table VI will be apparent from the foregoing discussion, the preferred values for $n$ are in the range of about 0.9 to 2.5.

The ease of biodegradation of the ether alcohol sulfate detergents was measured in the river water test. Detergent solutions containing 5 ppm of detergent in Schuylkill River water were stored in the dark at 20° C and aliquots were analyzed regularly by the Methylene Blue method [J. K. Weil and A. J. Stirton, J. Am. Oil Chemists' Soc. 41, 5,355–358(1964)]. The time for 80 percent degradation, from 5 ppm to 1 ppm, was noted and is recorded in Table VII, compared to the

TABLE VI

SURFACE ACTIVE PROPERTIES OF ETHER ALCOHOL SULFATE MIXTURES

| | | Average number of oxyalkyl groups, n | Lime soap disp. power, $\Delta$R | Detergency, 0.05% + 0.2% builder, 60° 300 p.p.m. | Foam height, 0.05% + 0.2% builder, 60° 300 p.p.m. mm. |
|---|---|---|---|---|---|
| 1. | $C_{12}H_{25}[OCH_2CH(CH_3)]_nOSO_3Na$ | 0.92 | 17 | 27 | 210 |
| 2. | $C_{14}H_{29}[OCH_2CH(CH_3)]_nOSO_3Na$ | 1.74 | 10 | 26 | 220 |
| 3. | $C_{16}H_{33}[OCH_2CH(CH_3)]_nOSO_3Na$ | 1.20 | 7 | 27 | 180 |
| 4. | $C_{16}H_{33}[OCH_2CH(CH_3)]_nOSO_3Na$ | 2.28[a] | 5 | 22 | 110 |
| 5. | $C_{16}H_{33}[OCH_2CH(C_2H_5)]_nOSO_3Na$ | 1.30 | 12 | 24 | 145 |
| 6. | $C_{18}H_{37}[OCH_2CH(CH_3)]_nOSO_3Na$ | 1.12 | 8 | 27 | 110 |
| 7. | $C_{18}H_{37}[OCH_2CH(C_2H_5)]_nOSO_3Na$ | 0.98 | 13 | 27 | 105 |

[a] Parent alcohol and first derivative removed by distillation, prior to sulfation

TABLE VII

BASE OF BIODEGRADATION

| | Time required for 80% degradation | Amount after 48 hours | remaining after 72 hours |
|---|---|---|---|
| $C_{14}H_{29}OCH_2CH(C_2H_5)OSO_3Na$ | 31 hours | 0 | 0 |
| $C_{16}H_{33}OCH_2CH(CH_3)OSO_3Na$ | 42 hours | 0 | 0 |
| $C_{16}H_{33}[OCH_2CH(CH_3)]_2OSO_3Na$ | 30 hours | 0 | 0 |
| $C_{16}H_{33}OCH_2CH(C_2H_5)OSO_3Na$ | 31 hours | 0 | 0 |
| $C_{16}H_{33}[OCH_2CH(C_2H_5)]_2OSO_3Na$ | 36 hours | 0 | 0 |
| $C_{18}H_{37}[OCH_2CH(CH_3)]_2OSO_3Na$ | 57 hours | 46% | 0 |
| $C_{12}H_{25}SO_3Na$[a] | 88 hours | 83% | 57% |
| LAS [b] | 85 hours | 84% | 53% |
| ABS [c] | greater than one month | 100% | 100% |

[a] Standard pure sodium dodecanesulfonate
[b] Linear alkylbenzenesulfonate
[c] Branched chain alkylbenzenesulfonate standard sodium dodecanesulfonate, linear alkylbenzenesulfonate, and branched chain alkylbenzenesulfonate. It is evident the ether alcohol sulfates of our invention, from propylene oxide and 1,2-butylene oxide, are very soft detergents, 100 percent degraded in less than 3 days.

While the ether alcohol sulfates are typically prepared as the sodium derivatives, the sulfation mixture can be neutralized with other alkaline reagents than NaOH. Reagents such as KOH, LiOH, $NH_4OH$ and $NH(C_2H_4OH)_3OH$ can be used to obtain the K, Li, $NH_4$, or $NH(C_2H_4OH)_3$ derivative.

The nature of our invention can be further understood from the examples which follow which illustrate, but are not intended to limit, the scope of the present invention.

EXAMPLE 1

2-Octadecyloxy-1-methylethanol and Sodium 2-Octadecyloxy-1-methylethyl Sulfate

Octadecanol, 128 grams (0.474 moles), and 0.6 g. of KOH were heated to 150°C. Liquid propylene oxide, 31.8 g. (0.548 moles), was added dropwise with stirring under an efficient reflux system to retain unreacted propylene oxide. During the addition, which took 30 minutes, the temperature was maintained between 145°–150°C. The alkaline catalyst was neutralized with 1.0 ml. of concentrated hydrochloric acid and inorganic salt was washed from an ethereal solution of the product with water. The residue from the ethereal solution was fractionally distilled to give pure $C_{18}H_{37}OCH_2$-$CHOHCH_3$ (b.p. 154°C at 0.2 mm Hg) (Table II, item 7).

The pure ether alcohol, 20 g. (0.061 moles) was dissolved in 100 ml. of $CCl_4$ and chilled to 0°C. Chlorosulfonic acid was added dropwise with stirring and the temperature was allowed to rise to 25°C. The sulfation mixture was rechilled to 0°C., diluted with an equal volume of cold ethanol and neutralized with 18 N NaOH. The product, an ether alcohol sulfate, was crystallized from the neutralized reaction mixture at −20°C. and recrystallized from absolute ethanol at 0°C. to give an 87 percent yield of pure $C_{18}H_{37}OCH_2CH(CH_3)OSO_3Na$ with the analysis shown in Table IV, item 7.

EXAMPLE 2

Sulfation of Oxypropylated Octadecanol Reaction Mixture

Octadecanol, 228 g. (0.844 moles), and 1.2 g. of KOH were heated to 160°C. and 66 g. (1.14 moles) of propylene oxide was added dropwise during 1.5 hours, keeping the mixture at 160–175°C. under efficient reflux to retain propylene oxide. The catalyst was neutralized with 1.75 ml. of concentrated HCl, 1, the product was dissolved in ethyl ether, washed free of inorganics, and ether was removed on the steam bath. Analysis of a sample of the reaction mixture by conversion to the acetate ester and gas-liquid chromatography on 20 percent silicone gum rubber column at 280°C. gave the following composition in mole percent: unreacted $C_{18}H_{37}OH$, 21.3; $C_{18}H_{37}OCH_2CHOHCH_3$, 51.2; $C_{18}H_{37}[OCH_2CH(CH_3)]_2OH$, 21.2; $C_{18}H_{37}[OCH_2CH(CH_3)]_3OH$, 6.3. The average number of oxypropyl groups added per mole of octadecanol was 1.12.

A 10 percent molar excess of chlorosulfonic acid was added dropwise to a stirred solution of the oxypropylation reaction product in cold $CCl_4$. The reaction mixture was allowed to warm to room temperature, diluted with an equal volume of cold ethanol and neutralized with 18 N NaOH. Evaporation of solvents gave an amorphous solid $C_{18}H_{37}[OCH_2CH(CH_3)]_{1.12}OSO_3Na$, 90 percent active ingredient, with the properties shown in Table VI (6).

EXAMPLE 3

Sulfation of Oxbutylated Octadecanol Reaction Mixture 1,2-Butylene oxide, 81.8 g. (1.135 moles) was added to 271 g. (1.003 moles) of octadecanol at 182°–188°C. under alkaline catalysis as described in Example 2. Gas-liquid chromatographic analysis of the acetate ester showed the following composition, in mole %: $C_{18}H_{37}OH$ 22.6; $C_{18}H_{37}OCH_2CHOHC_2H_5$ 59.0; $C_{18}H_{37}[OCH_2CH(C_2H_5)]_2OH$ 16.4; $C_{18}H_{37}[OCH_2CH(C_2H_5)]_3OH$ 2.0. The average number of oxybutyl groups per mole of octadecanol was 0.98. The reaction mixture was sulfated as described in Example 2 and the properties of the sulfation product $C_{18}H_{37}[OCH_2CH(C_2H_5)]_{0.98}OSO_3Na$ are shown in Table VI (7).

EXAMPLE 4

2-Octadecyloxy-1-ethylethanol and Sodium 2-Octadecyloxy-1-ethyethyl Sulfate

Fractional distillation of a portion of the reaction mixture of Example 3 separated the first derivative as $C_{18}H_{37}OCH_2CHOHC_2H_5$ b.p. 174°–176°C at 0.33 mm Hg. pressure, purity 97 percent by GLC, with the elemental analysis and physical constants shown in Table II. The pure ether alcohol was sulfated as described in Example 1 to give $C_{18}H_{37}OCH_2CH(C_2H_5)OSO_3Na$ with elemental analysis shown in Table IV and surface active properties shown in Table V (15).

EXAMPLE 5

1,4-Diethyl-3,6-Dioxatetracosanol and Sodium 1,4-Diethyl-3,6-Dioxatetracosanyl Sulfate Fractional distillation of a portion of the reaction mixture of Example 3 separated the second derivative as $C_{18}H_{37}[OCH_2CH(C_2H_5)]_2OH$, b.p. 197°–203°C. at 0.35 mm Hg., purity 98 percent by CLC, with the elemental anaylsis and physical constants shown in Table II. The pure ether alcohol was sulfated as described in Example 1 to give $C_{18}H_{37}[OCH_2CH(C_2H_5)]_2OSO_3Na$ with elemental analysis shown in Table IV (15).

EXAMPLE 6

Sulfation of Oxybutylated Hexadecanol Reaction Mixture 1,2-Butylene oxide, 19.2 g. (0.270 moles), and 40.1 g. (0.1654 moles) of hexadecanol were caused to react at 175°–188°C. under alkaline catalysis as described in Example 2. Gas-liquid chromatographic analysis of the acetate ester showed the following composition in mole percent: $C_{16}H_{33}OH$ 9.7; $C_{16}H_{33}OCH_2CHOHC_2H_5$ 56.5; $C_{16}H_{33}[OCH_2CH(C_2H_5)]_2OH$ 28.3; $C_{16}H_{33}[OCH_2CH(C_2H_5)]_3OH$ 5.5 The average number of oxybutyl groups was 1.30. The reaction mixture was sulfated as described in Example 2 and the properties of the sulfation product $C_{16}H_{33}[OCH_2CH(C_2H_5)]_{1.30}OSO_3Na$ are shown in Table VI (5).

EXAMPLE 7

2-Hexadecyloxy-1-ethylethanol and Sodium 2-Hexadecyloxy-1-ethylethyl Sulfate

Fractional distillation of a reaction mixture similar to that described in Example 6 separated the first derivative as $C_{16}H_{33}OCH_2CHOHC_2H_5$, b.p. 141°–142°C. at 0.16 mm hg., purity 99 percent by CLC, with the elemental analysis and physical constants shown in Table II. The pure ether alcohol was sulfated as described in Example 1 to give $C_{16}H_{33}OCH_2CH(C_2H_5)OSO_3Na$ with elemental analysis shown in Table IV and surface active properties shown in Table V (13).

EXAMPLE 8

Sulfation of Oxypropylated Hexadecanol Reaction Mixture

Propylene oxide was added to hexadecanol under alkaline catalysis as described in Example 2. Gas-liquid chromatographic analysis of the acetate ester gave the following composition in mole %: $C_{16}H_{33}OH$ 19.9; $C_{16}H_{33}OCH_2CHOHCH_3$ 49.5; $C_{16}H_{33}[OCH_2CH(CH_3)]_2OH$ 22.5 $C_{16}H_{33}[OCH_2CH(CH_3)]_3OH$ 6.5; $C_{16}H_{33}[OCH_2CH(CH_3)]_4OH$ 1.2.

The average number of oxypropyl groups was 1.20. The reaction mixture was sulfated as described in Example 2 and the properties of the sulfation product $C_{16}H_{33}[OCH_2CH(CH_3)]_{1.20}OSO_3Na$ are shown in Table VI (3).

EXAMPLE 9

2-Hexadecyloxy-1-methylethanol and Sodium 2-Hexadecyloxy-1-methylethyl Sulfate

Fractional distillation of a portion of the reaction mixture of Example 8 separated the first derivative as $C_{16}H_{33}OCH_2CHOHCH_3$, b.p. 123°–124°C. at 0.08 mm Hg., with the elemental analysis and physical constants shown in Table II. The pure ether alcohol was sulfated as described in Example 1 to give $C_{16}H_{33}OCH_2CH(CH_3)OSO_3Na$ with elemental analysis shown in Table IV and surface active properties shown in Table V (5).

EXAMPLE 10

Sulfation of Oxypropylated Tetradecanol Reaction Mixture

Propylene oxide, 47 g. (0.81 moles), was added to 155 g. (0.725 moles) of tetradecanol under alkaline catalysis as described in Example 2. Gas-liquid chromatographic analysis of the acetate ester showed the following composition in mole%: $C_{14}H_{29}OH$ 5.5; $C_{14}H_{29}OCH_2CHOHCH_3$ 39.7; $C_{14}H_{29}[OCH_2CH(CH_3)]_2OH$ 34.7; $C_{14}H_{29}[OCH_2CH(CH_3)]_3OH$ 15.8; $C_{14}H_{29}[OCH_2CH(CH_3)]_4OH$ 4.4 The average number of oxypropyl groups was 1.74. The reaction product was sulfated as described in Example 2 to give $C_{14}H_{29}[OCH_2CH(CH_3)]_{1.74}OSO_3Na$ with the surface active properties shown in Table VI (2). The reaction product prior to sulfation may be fractionally distilled to separate the first and second derivatives (Table II) which can be sulfated to give the ether alcohol sulfates of Table V (3, 4).

EXAMPLE 11

Sulfation of Oxypropylated Dodecanol Reaction Mixture

Propylene oxide 47 g. (0.81 moles) was added to 153 g. (0.823 moles) of dodecanol under alkaline catalysis as described in Example 2. Gas-liquid chromatographic analysis of the acetate ester showed the following composition in mole %: $C_{12}H_{25}OH$ 28.4; $C_{12}H_{25}OCH_2CHOHCH_3$ 54.4; $C_{12}H_{25}[OCH_2CH(CH_3)]_2OH$ 14.4; $C_{12}H_{25}[OCH_2CH(CH_3)]_3OH$ 2.5; $C_{12}H_{25}[OCH_2CH(CH_3)]_4OH$ 0.3 The average number of oxypropyl groups was 0.92. The reaction product was sulfated as described in Example 2 to give $C_{12}H_{25}[OCH_2CH(CH_3)]_{0.92}OSO_3Na$ with the surface active properties shown in Table VI (1). The reaction product prior to sulfation may be fractionally distilled to separate the first derivative (Table II) which can be sulfated to give the ether alcohol sulfate of Tables IV (1) and V (1).

We claim:

1. A compound of the formula

n—$C_{18}H_{37}[OCH_2CH\ C_2H_5]_2\ OSO_3Na$.

* * * * *